United States Patent
Ganser et al.

(10) Patent No.: US 9,501,869 B2
(45) Date of Patent: Nov. 22, 2016

(54) SYSTEMS AND METHODS FOR PRESENTING VEHICLE COMPONENT INFORMATION

(71) Applicant: Gulfstream Aerospace Corporation, Savannah, GA (US)

(72) Inventors: Daniel Joseph Ganser, Savannah, GA (US); Matthew M. Kossler, Savannah, GA (US); Mitchell Wilson Southard, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 388 days.

(21) Appl. No.: 13/664,716

(22) Filed: Oct. 31, 2012

(65) Prior Publication Data

US 2014/0118349 A1 May 1, 2014

(51) Int. Cl.
*G06T 19/00* (2011.01)
*G06F 17/30* (2006.01)
*G06Q 10/08* (2012.01)

(52) U.S. Cl.
CPC ......... *G06T 19/00* (2013.01); *G06F 17/30061* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 6,629,065 B1 * | 9/2003 | Gadh | G06T 17/10 345/420 |
| 6,990,228 B1 * | 1/2006 | Wiles et al. | 382/154 |
| 2003/0033104 A1 * | 2/2003 | Gooche | B25H 7/04 702/95 |
| 2004/0249809 A1 * | 12/2004 | Ramani et al. | 707/4 |
| 2010/0042952 A1 | 2/2010 | Geesey | |
| 2011/0202492 A1 | 8/2011 | Salemann | |

FOREIGN PATENT DOCUMENTS

WO 2012117103 A2 9/2012
WO WO 2012117103 A3 * 2/2013

OTHER PUBLICATIONS

Regli et al, Managing digital libraries for computer-aided design, 2000, Computer-Aided Design 32, pp. 119-132.*
Phelps, "Object Selection Methods within AutoCAD", Jun. 2012, CADline, https://www.cadlinecommunity.co.uk/hc/en-us/article_attachments/200584352/Object_Selection_Methods_within_AutoCAD.pdf.*
United States International Searching Authority, International Search Report and Written Opinion for International Application No. PCT/US2013/067800, mailed Apr. 24, 2014.
The International Bureau of WIPO, International Preliminary Report on Patentability for International Application No. PCT/US2013/067800, mailed May 14, 2015.

* cited by examiner

*Primary Examiner* — Kee M Tung
*Assistant Examiner* — Xin Sheng
(74) *Attorney, Agent, or Firm* — Lorenz & Kopf, LLP (LKGlobal)

(57) ABSTRACT

A system and method for presenting vehicle component information includes storing voxel data in a computerized database. The voxel data represents a plurality of voxels spatially arranged to encompass a shape representing at least part of a vehicle. A plurality of component records is stored in the database, wherein each component record corresponds to a component of the vehicle. Each component record is associated with voxel data representing at least one voxel. A graphical representation of at least one of the components is displayed on a display.

12 Claims, 5 Drawing Sheets

SYSTEMS AND METHODS FOR PRESENTING VEHICLE COMPONENT INFORMATION

TECHNICAL FIELD

The technical field relates generally to systems and methods for storing information and data related to vehicle components.

BACKGROUND

Product lifecycle management ("PLM") systems are often utilized to store records regarding components of larger devices, such as vehicles, as well as other industrial machinery. These PLM systems essentially act as a "drawing vault" to save drawings and other information pertaining to various versions of the components, as well as assembly and installation information.

However, the organization of such PLM systems, coupled with the vast number of components, including all the revisions to the components, makes searching for specific components difficult. Users may spend hours searching for components, and attempting to ensure they are working with the latest version of the component, before performing value-added work.

As such, it is desirable to provide a system and method for allowing users to quickly locate components and to obtain information pertaining to the components. In addition, other desirable features and characteristics will become apparent from the subsequent summary and detailed description, and the appended claims, taken in conjunction with the accompanying drawings and this background.

BRIEF SUMMARY

A method for presenting vehicle component information includes storing voxel data in a database. The voxel data represents a plurality of voxels spatially arranged to encompass a shape representing at least part of a vehicle. The method also includes storing a plurality of component records in the database, wherein each component record corresponds to a component of the vehicle. The method further includes associating each component record with voxel data representing at least one voxel. The method also includes displaying a graphical representation of at least one of the components on a display.

A system for presenting vehicle component information includes a computerized database. The database is configured to store voxel data and a plurality of component records. The voxel data represents a plurality of voxels spatially arranged to encompass a shape representing at least part of a vehicle. Each component record corresponds to a component of the vehicle and is associated with voxel data representing at least one voxel. The system also includes a controller in communication with the database. The controller is configured to receive the voxel data and the component records from the database. The system also includes a display configured to display a graphical representation of at least one of the components.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, methods and systems for presenting vehicle component information are shown and described herein.

Figure 1:
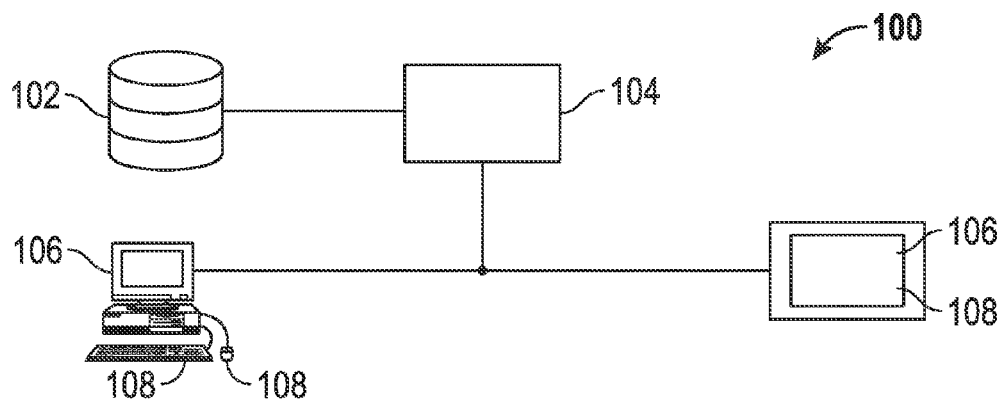
FIG. 1 is a block diagram showing one embodiment of a system for presenting vehicle component information.

Referring to FIG. 1, an exemplary system 100 is shown. The system 100 may be referred to as a product lifecycle management ("PLM") system 100; however, such reference should not be read as limiting in any way. The system 100 includes a computerized database 102. The database 102 is capable of storing digital data, records, and/or information. The database 102 may be implemented using any suitable techniques and devices, including, but not limited to, magnetic media (e.g., disk drives, tape, etc.), optical media (e.g., compact discs), and semiconductor-based storage devices (e.g., random access memory, read only memory, flash memory, etc.). Furthermore, the database 102 may be implemented with one or more technique and/or device, such that the data, records, and/or information stored in the database may be located in a single physical location or in multiple locations.

The system 100 also includes a controller 104. The controller 104 may be implemented with a microprocessor, microcontroller, application specific integrated circuit ("ASIC"), or other computing device for receiving inputs and/or data, performing calculations, and/or transferring signals and/or data to other devices. However, the controller 104 may be implemented with non-computing devices, e.g., analog circuits and/or relays. In the illustrated embodiment, the controller 104 is in communication with the database 102 such that the controller 104 may receive data, records, or information from the database 102 and transmit data, records, or information to the database 102. Of course, the controller 104 and the database 102 may be integrated into a single unit, or be apart from one another, as well recognized by those skilled in the art.

The system 100 further includes at least one client computer 105 in communication with the controller 104. The data, records, and other information are transmittable between the controller 104 and the client computer 105. In some embodiments, the system 100 is configured to accommodate a plurality of client computers 105, such that the data, records, and information may be used simultaneously by multiple users.

Each client computer 105 includes a display 106. The display 106 displays data, graphics, or other information provided by the controller 104 to a user. Each client computer 105 also includes an input device 108. The input device 108 allows the user to input commands, data, or other instructions to the controller 104. The input device 108 may include a keyboard, a mouse, a touch screen layer on the display 106, and/or other suitable devices.

The system 100 described above may be utilized to implement the methods for presenting vehicle component information described herein. However, other suitable systems, devices, and/or components may alternatively be utilized. As such, the reference to components of the system 100 in the description of the methods hereafter should not be limiting in any way.

Figure 2:
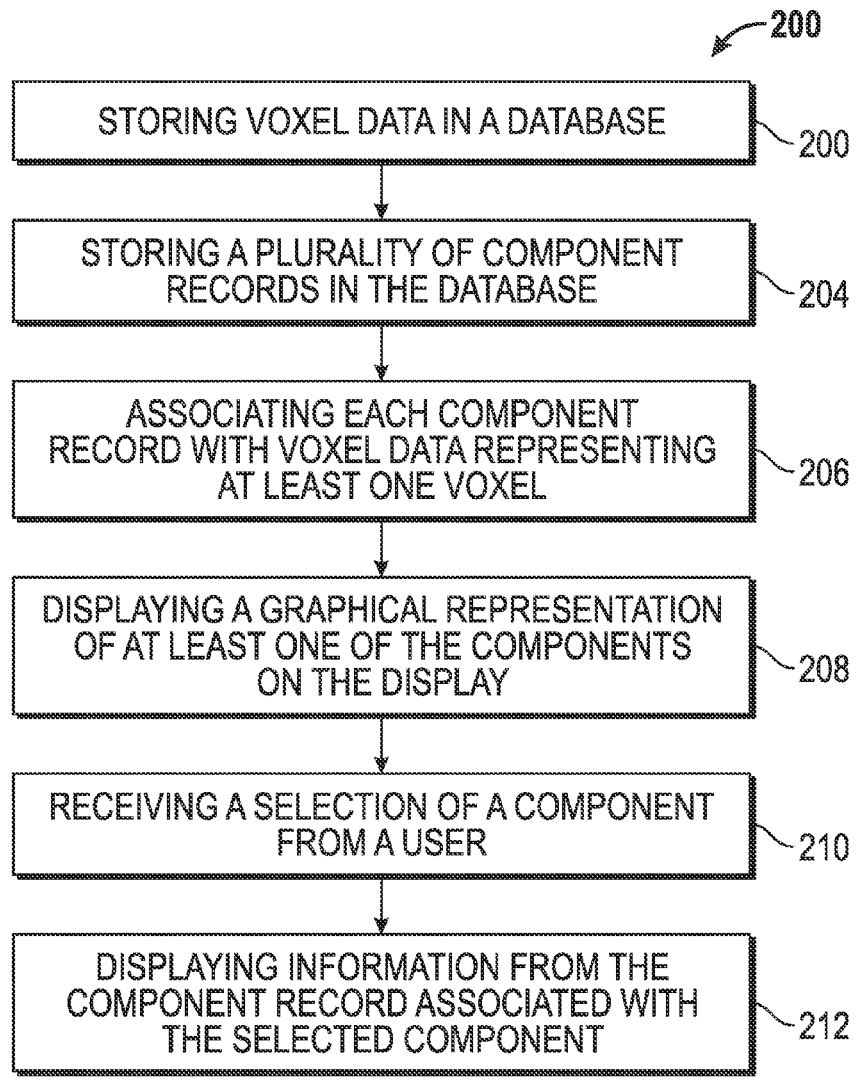
FIG. 2 is a flowchart showing one embodiment of a method for presenting vehicle component information.

Referring to FIG. 2, one method 200 includes the step 202 of storing voxel data in the database 102. Accordingly, the database 102 of the illustrated embodiment is configured to store the voxel data. The voxel data represents a plurality of voxels 300, as shown in an illustrated embodiment in FIG. 3. A voxel 300, also known as a volumetric pixel, is a volume element representing a region in three dimensional space. The plurality of voxels 300 in the voxel data are spatially arranged to encompass a shape. More specifically, the shape represents at least part of a vehicle 302. In the illustrated embodiment, the plurality of voxels 300 represents the shape of an entire aircraft (not separately numbered). The database 102 may be configured to store voxel data for a plurality of different vehicles 302, e.g., different aircraft models or configuration. Furthermore, the database 102 may store voxels 300 related to objects other than vehicles 302.

Figure 4:
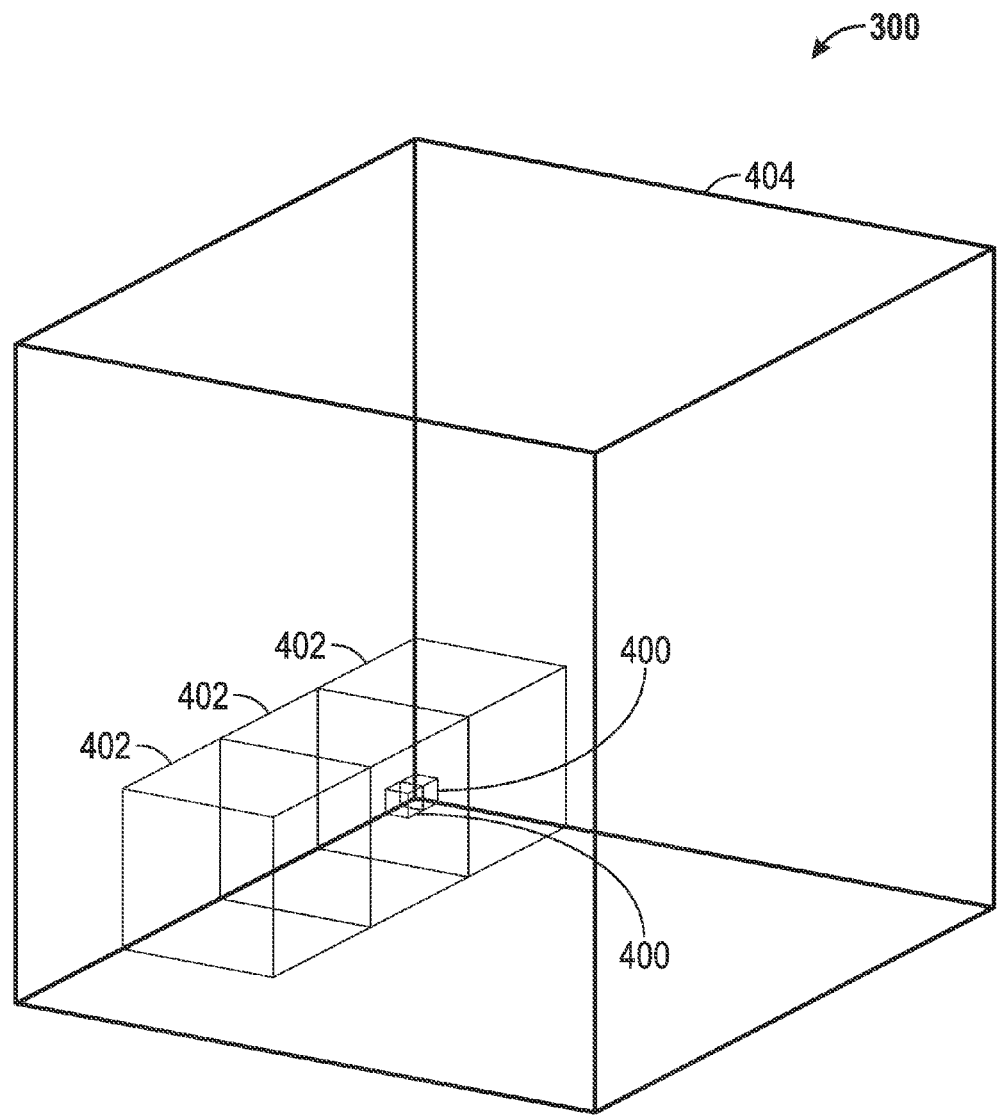
FIG. 4 is a graphical representation of a plurality of voxels of different sizes.

The voxels 300 represented by the voxel data may have different sizes. For instance, in the illustrated embodiment, the voxels 300 have three different sizes. Specifically, with reference to FIG. 4, the voxel data of the illustrated embodiment represents a plurality of small voxels 400, a plurality of medium voxels 402, and a plurality of large voxels 404. Each of the large voxels 404 represent a volume (e.g., a first volume) larger than a volume represented by each of the medium voxels 402 (e.g., a third volume) and each of the medium voxels 402 represent a volume larger than a volume represented by each of the small voxels 400 (e.g., a second volume). More specifically, in the illustrated embodiment, the voxels 300 are cubical in shape. Each side of each small voxel 400 represents a length of one inch, each side of each medium voxel 402 represents a length of five inches, and each side of each large voxel 404 represents a length of 20 inches. As such, in the illustrated embodiment, the volume represented by each small voxel 400 is 1 cubic inch ($in^2$), the volume represented by each medium voxel 402 is 5 $in^2$, and the volume represented by each large voxel 404 is 20 $in^2$. However, in other embodiments, each voxel 300 may have a shape other than a cube and each voxel may have different sizes.

The volumes represented by the different sized voxels 400, 402, 404 of the illustrated embodiment may be spatially coincident with one another. That is, one voxel 400, 402, 404 may represent a portion of the volume that is represented by another voxel 402, 404, 400 For example, a volume represented by one of the small voxels 400 may be spatially coincident with a portion of the volume represented by one of the medium voxels 402 and/or one of the large voxels 404. Moreover, a volume represented by one of the medium voxels 402 may be spatially coincident with a portion of the volume represented by one of the large voxels 404.

Figure 5:
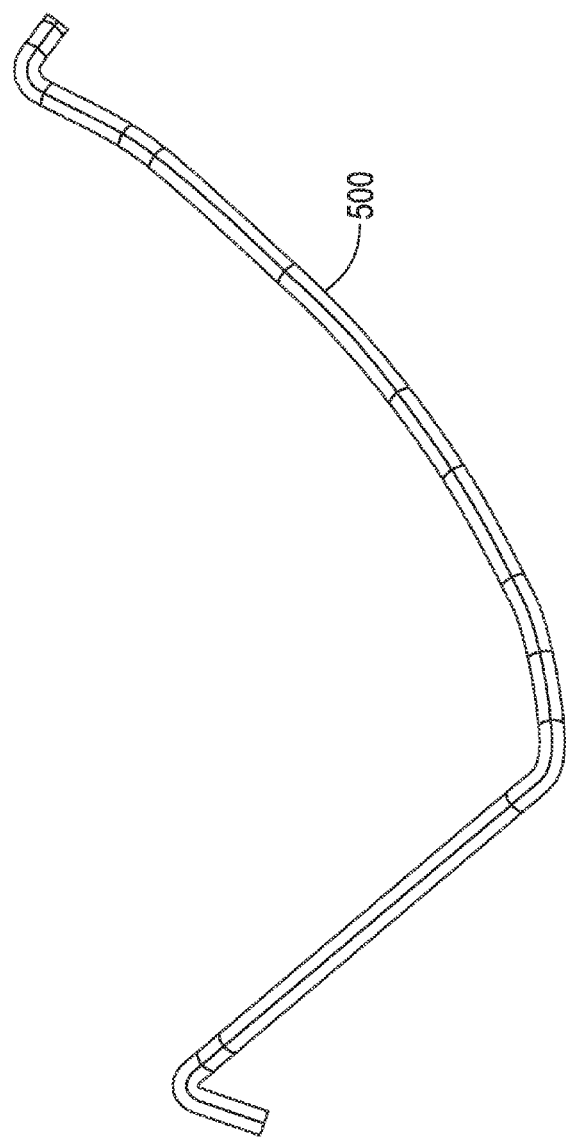
FIG. 5 is a graphical representation of an exemplary component of the vehicle.

Referring again to FIG. 2, the method 200 also includes the step 204 of storing a plurality of component records in the database 102. Accordingly, the database 102 of the illustrated embodiment is configured to store the component records. Each component record corresponds to a component 500 of the vehicle. FIG. 5 shows a tube as an example of one such component 500. However, those skilled in the art appreciate that numerous other components 500 may be represented in the component records of the database 102.

Each component record may include data regarding the size and shape of the component 500. Each component record may also include data referring to: one or more vehicle systems that the component 500 is associated with, one or more design teams responsible for the component 500, and/or one or more functions of the component 500. Of course, other data may be associated with each component record.

The database 102 may store multiple component records for each component 500. For example, one component record corresponding to one version of the component 500 and another component record corresponding to another version of the component 500 may be stored in the database 102. The different versions of the component 500 may refer to different configurations of the vehicle, design changes of the component 500, or other differences between similar components 500.

Figure 6:
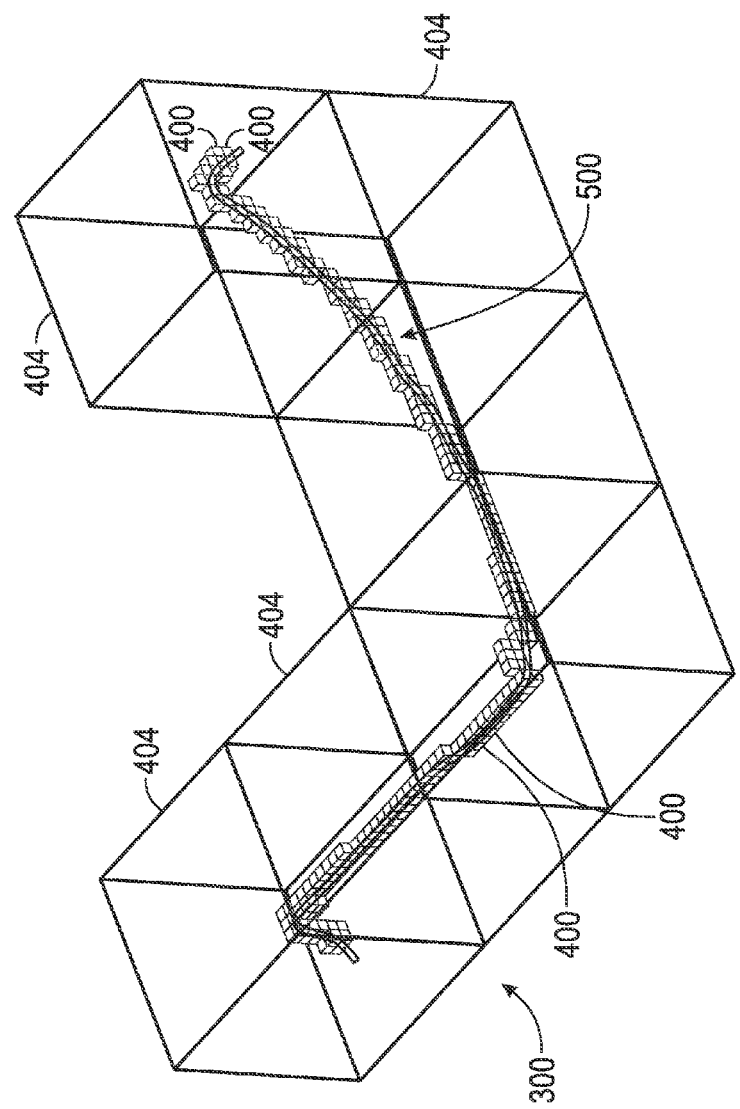
FIG. 6 is a graphical representation of the exemplary component and a plurality of different sized voxels surrounding the exemplary component.

The method 200 also includes the step 206 of associating each component record with voxel data representing at least one voxel 300. Said another way, each component record is linked to one or more voxels 300, such that the location of the component 500 on the vehicle 302 is stored in the database 102. Each component record may be associated with more than one voxel 300. For instance, the component 500 may span across multiple voxels 300, as shown in FIG. 6. Furthermore, since the different sized voxels 400, 402, 404 may be spatially coincident with one another, the component 500 may be associated with one or more large voxels 404, one or more medium voxels 402, and/or multiple small voxels 400, as shown in FIG. 7. The spatial orientation of each component 500, i.e., how each component 500 is situated in the vehicle 302, may also be stored in the database 102.

The method 200 further includes the step 208 of displaying a graphical representation of at least one of the components 500 on the display 106. In the illustrated embodiment, the display 106 is capable of displaying the component 500 in the component records of the database 102 associated with each vehicle 302. The graphical representation of each component 500 preferably reflects the size and shape of the component stored in the database 102. Furthermore, the components 500 are displayed based on their relative position in the vehicle 302. This relative position is determined based on the voxel(s) 300 related to each component 500 as well as the spatial orientation of each component 500. Said another way, the components 500 are displayed on the display 106 in relationship to the voxel(s) 300 the components 500 are associated with.

Figure 3:
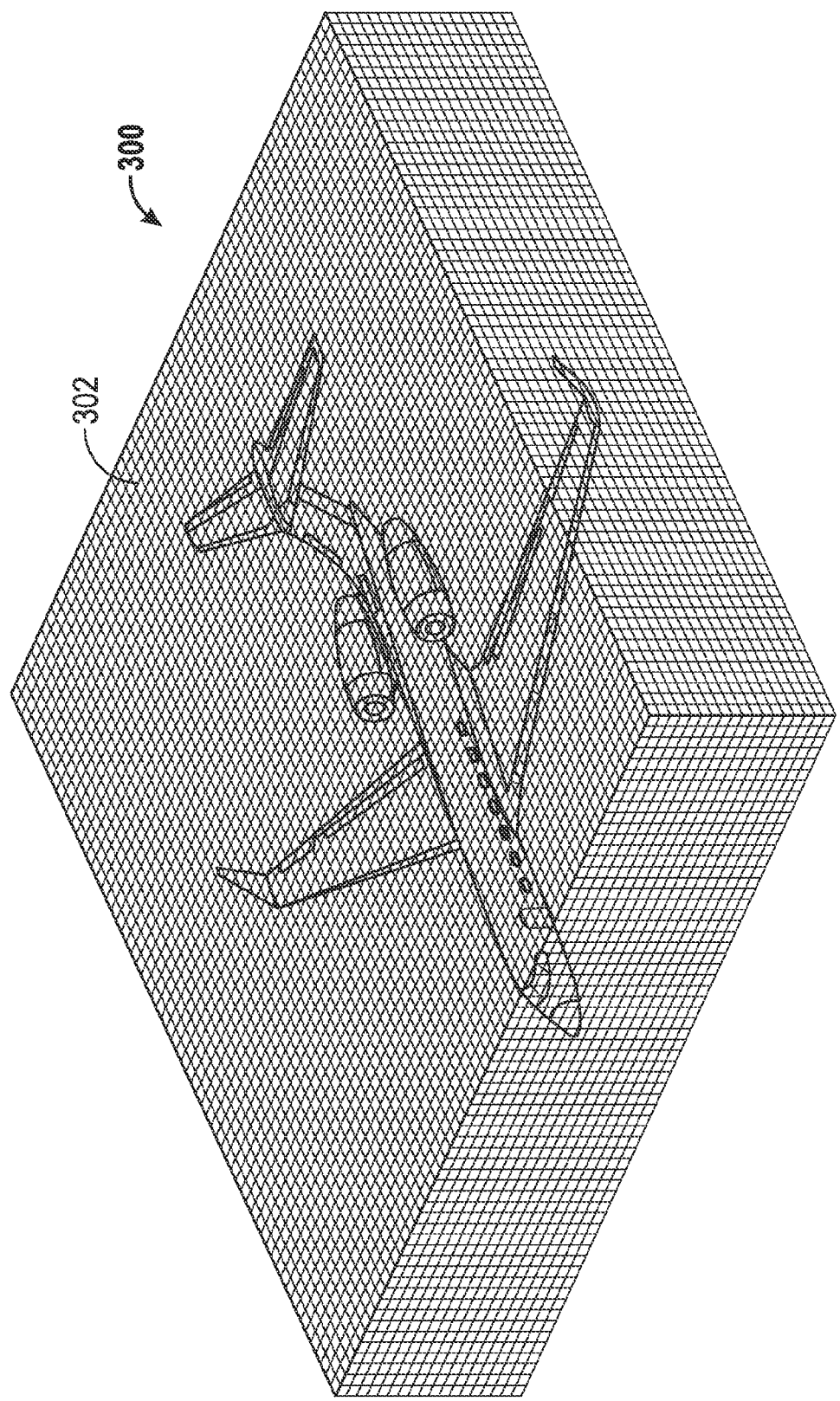
FIG. 3 is a graphical representation of a plurality of voxels spatially arranged to encompass a vehicle.

By presenting the components 500 of the vehicle 302 on the display 106 in this fashion, the user may quickly locate the component 500 that they are interested in, based on the location of that component 500 in the vehicle 302. Specifically, the system 100 may display the entire vehicle 302, e.g., as shown in FIG. 3. The user may then define a bounding box (not shown) around a certain portion of the vehicle 302, using the input device 108. In response, the voxels 300, and the components 500 associated with the bounding box are then displayed. Said another way, the volume of each voxel 300 and the components contained within the voxels 300 are displayed. The user may then define another bounding box to further "zoom in" to locate the desired components. Of course, other techniques for "zooming in" on a portion of the vehicle may also be implemented.

The system 100 of the illustrated embodiment is configured to allow a user of the system 100 to change, modify, or otherwise customize what is displayed on the display 106. For example, the controller 104, display 106, and/or input device 108 are operable to:

- view certain portions of the vehicle 302;
- select the observation angle at which the vehicle 302 may be displayed;
- view components 500 corresponding to one or more specific systems of the vehicle 302;
- view components 500 related to one or more specific design teams; view components 500 related to one or more specific functions of the vehicle 302;
- view only a specific component 500; and/or
- zoom-in or zoom-out from certain portions of the vehicle 302.

Of course, numerous other techniques for viewing the components 500 will be realized by those skilled in the art. Furthermore, the system 100 may accept input of a part number of a component 500 to display that specific component 500, as well as the location of that component 500 as part of the vehicle 302.

The user may also utilize the input device 108 for selecting a component 500. For example, the mouse may be used to "click" on one of the displayed components 500 or the touchscreen may be utilized to receive a "tap" on one of the displayed components 500. As such, the method 200 may further include the step 210 of receiving a selection of a component 500 from a user.

The method 200 may also include the step 212 of displaying information from the component record. This step 212 is performed in response to receiving the selection of the component 500 from the user. The information displayed may include, but is certainly not limited to, a name of the component 500, a part number of the component 500, a revision number of the component 500, a date or dates in which the component 500 has been modified, a drawing of the component 500, and a list of materials needed to manufacture the component 500.

The method 200 may further include adding, modifying, and/or deleting component records from the database 102. As such, users may add new components 500 and/or new versions of components 500 to the database 102, change characteristics of components 500 in the database 102, or remove components 500 from the database 102. Furthermore, the system 100 allows multiple users to access the component records simultaneously. As such, users of the system 100 will have near instantaneous access to changes in components 500 made by other users.

The database 102 may also be configured to store data relating to hazard zones of the vehicle. These hazard zones, also referred to as "keep-out zones" are regions associated with the vehicle in which components 500, or at least certain components 500, should not be located. The hazard zones may be delineated by voxels 300. The system 100 may be configured to prevent component records from being associated with voxels 300 (and corresponding voxel data). As such, designers and other users are prevented from placing components 500 in hazard zones.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for presenting vehicle component information, said method comprising:
    storing voxel data in a database wherein the voxel data represents a plurality of small voxels and a plurality of large voxels spatially arranged to encompass a shape representing a vehicle, and wherein each of the large voxels represent a first volume larger than a second volume represented by each of the small voxels;
    storing a plurality of component records in the database each with a spatial orientation, wherein each component record corresponds to a component of the vehicle, and wherein the spatial orientation indicates how the component is situated in the vehicle, wherein one component record corresponds to one version of a component of the vehicle and another component record corresponds to another version of the component;
    associating each component record with voxel data representing at least one small voxel and at least one large voxel;
    displaying a graphical representation of at least part of the vehicle including at least one of the components on a display based on the spatial orientation of each of the at least one of the components with respect to the vehicle in response to a user input including a bounding box indicating the at least part of the vehicle; and
    displaying the plurality of component records based on the at least one of the components of the displayed graphical representation and based on the user input.

2. The method of claim 1, wherein each component record includes information associated with a product lifecycle management system record.

3. A method as set forth in claim 2 wherein the voxel data further represents a plurality of medium voxels, wherein each of the medium voxels represent a third volume larger than the second volume represented by each of the small voxels and smaller than the first volume represented by each of the large voxels.

4. A method as set forth in claim 2 wherein the third volume represented by one of the small voxels may be spatially coincident with a portion of the first volume represented by one of the large voxels.

5. A method as set forth in claim 2 further comprising receiving a selection of a component from a user.

6. A method as set forth in claim 5 further comprising displaying information from the component record in response to receiving the selection of the component from the user.

7. A system for presenting vehicle component information, said system comprising:
    a computerized database configured to store voxel data and a plurality of component records, wherein the voxel data represents a plurality of small voxels and a plurality of large voxels spatially arranged to encompass a shape representing a vehicle, wherein each of the large voxels represent a first volume larger than a second volume represented by each of the small voxels, wherein each component record corresponds to a component of the vehicle, and wherein each component record is associated with each with a spatial orientation and voxel data representing at least one small voxel and at least one large voxel, and wherein a first component record of the plurality of component records corresponds to at least one of a first version of the component and a first configuration of the vehicle and a second component record of the plurality of component records corresponds to at least one of a second version of the component and a configuration of the vehicle;
a controller in communication with said database and configured to receive the voxel data and the component records from said database; and
a display configured to display a graphical representation of at least part of the vehicle including at least one of the components, and
wherein the controller is configured to cause the display to display a graphical representation of at least part of the vehicle including at least one of the components on a display based on the spatial orientation of each of the at least one of the components with respect to the vehicle and based on a user input including a bounding box indicating the at least part of the vehicle, and
wherein the controller is further configured to cause the display to display the plurality of component records in response to the user input.

8. The system of claim 7, wherein each of the plurality of component records includes information associated with a product lifecycle management system record.

9. A system as set forth in claim 8 wherein the voxel data further represents a plurality of medium voxels, wherein each of the medium voxels represent a third volume larger than the second volume represented by each of the small voxels and smaller than the first volume represented by each of the large voxels.

10. A system as set forth in claim 8 wherein the second volume represented by one of the small voxels may be spatially coincident with a portion of the first volume represented by one of the large voxels.

11. A system as set forth in claim 8 further comprising an input device in communication with said controller and configured to receive a selection of a component from a user and send that selection to said controller.

12. A system as set forth in claim 11 wherein said display is configured to display information from the component record in response to the controller receiving the selection of the components.

* * * * *